US009611954B2

(12) United States Patent
Malaspina

(10) Patent No.: US 9,611,954 B2
(45) Date of Patent: Apr. 4, 2017

(54) CONSTRUCTION CONDUIT SECURING DEVICE

(71) Applicant: Ray Malaspina, Antioch, CA (US)

(72) Inventor: Ray Malaspina, Antioch, CA (US)

(\*) Notice: Subject to any disclaimer, the term of this patent is extended or adjusted under 35 U.S.C. 154(b) by 0 days.

(21) Appl. No.: 14/702,614

(22) Filed: May 1, 2015

(65) Prior Publication Data

US 2015/0337990 A1 Nov. 26, 2015

Related U.S. Application Data

(60) Provisional application No. 62/002,686, filed on May 23, 2014.

(51) Int. Cl.
| F16L 3/10 | (2006.01) |
| F16L 3/26 | (2006.01) |
| F16L 3/137 | (2006.01) |
| F16L 3/123 | (2006.01) |
| H02G 3/32 | (2006.01) |

(52) U.S. Cl.
CPC .......... *F16L 3/26* (2013.01); *F16L 3/123* (2013.01); *F16L 3/137* (2013.01); *H02G 3/32* (2013.01)

(58) Field of Classification Search
CPC ......... F16L 3/1207; F16L 3/1233; F16L 3/10; F16L 3/12; F16L 3/1211; F16L 3/24; F16L 3/1008; F16L 3/127; F16L 3/137; Y10T 29/49826
USPC ....................... 248/73, 74.1, 74.2, 74.3, 74.4
See application file for complete search history.

(56) References Cited

U.S. PATENT DOCUMENTS

| 2,352,823 | A | * | 7/1944 | Ellinwood | ............ | F16L 3/1233 |
| | | | | | | 174/40 CC |
| 2,393,033 | A | * | 1/1946 | Ellinwood | ............ | F16L 3/1233 |
| | | | | | | 174/155 |
| 3,227,406 | A | * | 1/1966 | Shelton | ............... | F16L 3/1091 |
| | | | | | | 248/74.4 |
| 4,899,991 | A | * | 2/1990 | Brunkan | ............. | E04H 17/1434 |
| | | | | | | 256/24 |
| 5,261,633 | A | * | 11/1993 | Mastro | ...................... | F16L 3/18 |
| | | | | | | 248/68.1 |
| 5,438,795 | A | * | 8/1995 | Galbraith | ............... | A01G 17/06 |
| | | | | | | 256/48 |
| 5,587,555 | A | * | 12/1996 | Rinderer | ................... | F16L 3/22 |
| | | | | | | 174/154 |
| 6,398,170 | B1 | * | 6/2002 | Wada | ....................... | F16L 3/123 |
| | | | | | | 248/68.1 |
| 8,596,618 | B2 | * | 12/2013 | Gray | .................... | E04H 17/1421 |
| | | | | | | 256/65.02 |
| 8,602,798 | B2 | * | 12/2013 | Downing | ................... | F16L 3/00 |
| | | | | | | 248/65 |

(Continued)

FOREIGN PATENT DOCUMENTS

JP 63-383923 * 6/1988

*Primary Examiner* — Rodney Mintz
*Assistant Examiner* — Daniel Kenny
(74) *Attorney, Agent, or Firm* — West & Associates, A PC; Stuart West; Shaun Sluman

(57) ABSTRACT

A conduit fixture comprising one or more connection segments each with a first planar portion and a second planar portion extending substantially orthogonally from said first planar portion, and a conduit holder extending from the second planar portions that is configured to hold a portion of wiring conduit extending in a direction substantially orthogonal to the plane of the first planar portions.

6 Claims, 4 Drawing Sheets

(56) References Cited

U.S. PATENT DOCUMENTS 8,894,023 B2 * 11/2014 Dann .................. F16L 3/127
                                                                         248/58

* cited by examiner

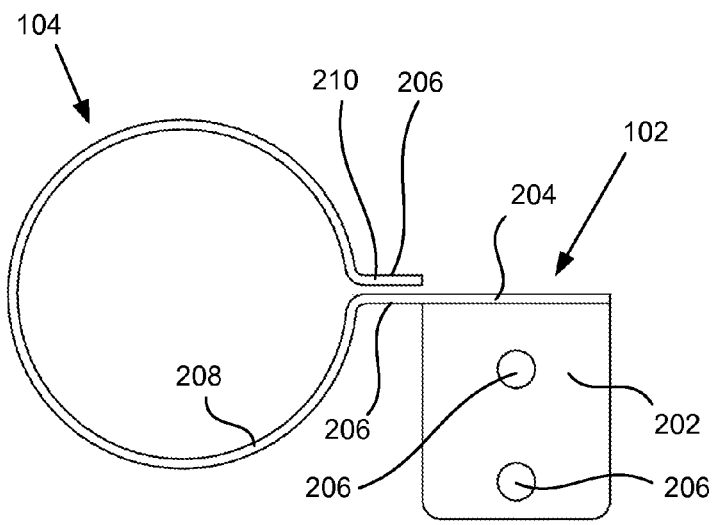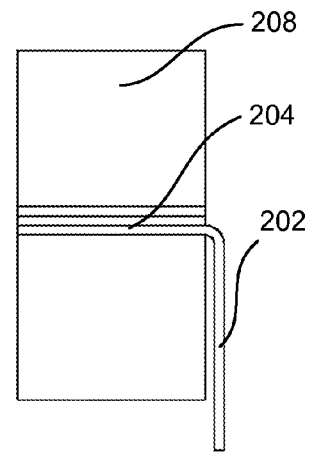
FIG. 2A  FIG. 2B
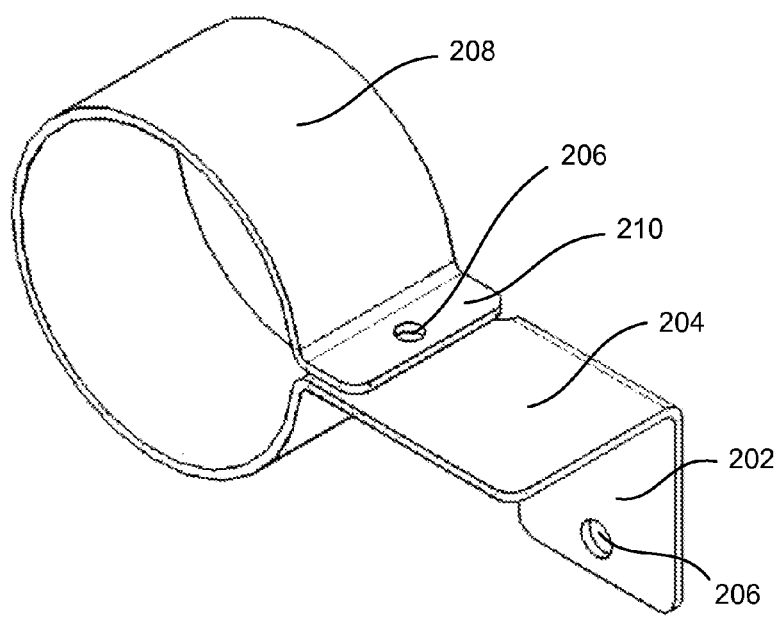
FIG. 2C

CONSTRUCTION CONDUIT SECURING DEVICE

CLAIM OF PRIORITY

This Application claims priority under 35 U.S.C. §119(e) from earlier filed U.S. Provisional Application Ser. No. 62/002,686, filed May 23, 2014, which is hereby incorporated by reference.

BACKGROUND

Field of the Invention

The present disclosure relates to construction fixtures, particularly fixtures for holding conduit passed through walls.

Background

During construction, remodeling, renovation, or retrofitting of a building, wires are routinely run from one area of a building to another. To keep the wires together and to route them easily through walls or floors that have already been built, conduits or chases are often installed within the walls or floors. Conduits and chases are tubes or pipes that provide a route for the wiring through the building, and assist in protecting the wiring or cabling once it is in place.

However when walls or floors have already been built, such as during retrofitting of an existing building, installing new conduits and chases can be difficult. Often, holes must be cut in the walls so that a length of conduit can be inserted into the walls through the holes to provide a route for wiring to extend to other parts of the building. In some cases conduits installed in this manner can be left loose within the walls. However, when wiring or cabling is pulled through the conduit, the conduit can be pulled out of place or even out of the wall.

Some methods have been developed to secure conduit in place within walls to prevent these problems, but these methods involve installing an elaborate system of strut channels, strut straps, and/or angle connectors. This system can be difficult and time consuming to install, and can be bulky and unsightly.

What is needed is a conduit fixture with connection sections that can be installed on building components such as wall studs or drywall, and that also has a conduit holding section configured to securely hold conduit in place relative to the building component.

BRIEF DESCRIPTION OF THE DRAWINGS

FIG. 2A depicts a front view of a first embodiment of a conduit fixture.

FIG. 2B depicts a side view of a first embodiment of a conduit fixture.

FIG. 2C depicts an angled view of a first embodiment of a conduit fixture.

DETAILED DESCRIPTION

Figure 1:
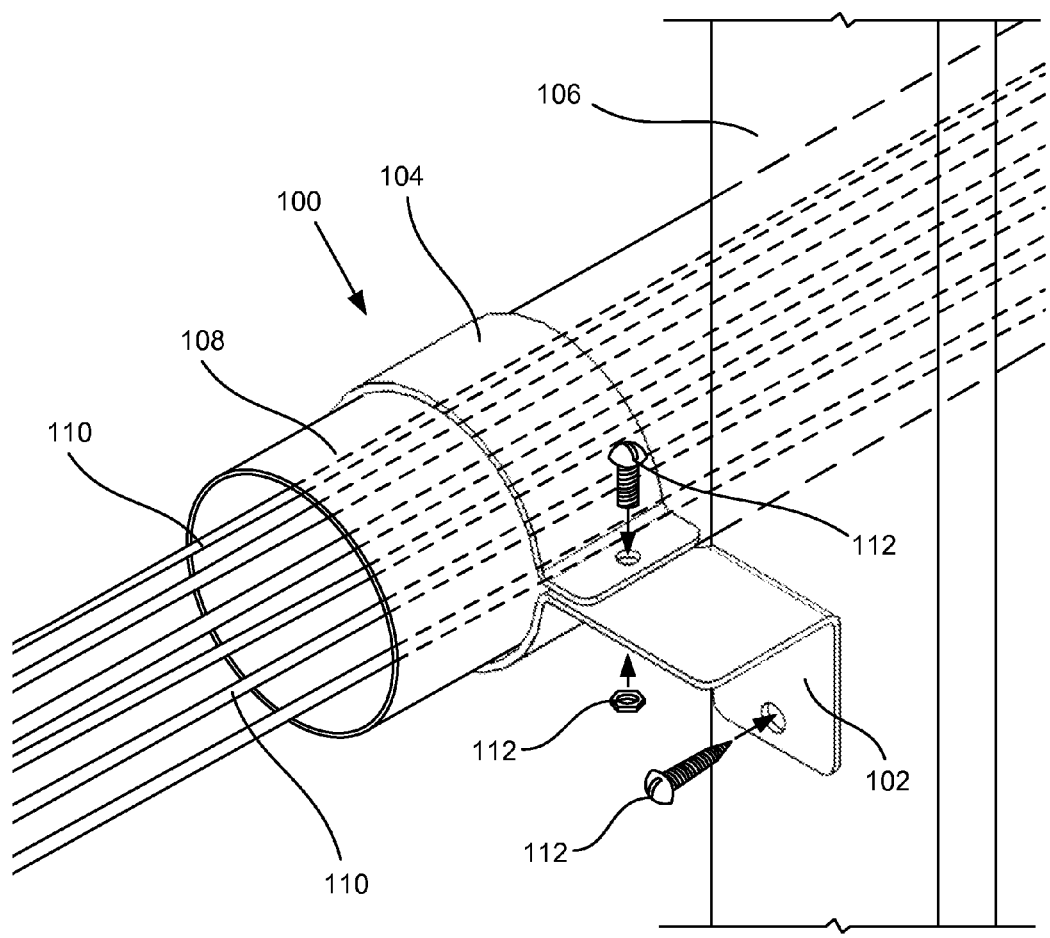
FIG. 1 depicts an embodiment of a conduit fixture in use with conduit and a building component.

FIG. 1 depicts an exemplary embodiment of a conduit fixture 100. A conduit fixture 100 can comprise one or more connection segments 102 and a conduit holder 104. The connection segment 102 and/or conduit holder 104 can comprise metal, metal alloy, plastic, PVC, polymer, and/or any other desired material.

The connection segment 102 can be configured to be coupled with a building component 106, and the conduit holder 104 can be configured to hold a conduit 108 through which wiring 110 can pass. A building component 106 can be a wall stud, drywall, door frame, window frame, joist, or any other component of a building being built, renovated, remodeled, or retrofitted. The conduit 108 can be a conduit or chase such as a tube, pipe, or other channel that can provide a route for wiring through a building inside and/or outside walls or floors. The wiring 110 can be electrical wires, audio cabling, video cables, data cables, or any other type of wiring or cabling that is to extend from one part of a building to another.

FIGS. 2A-2C respectively depict a front view, side view, and angled view of a first embodiment of a conduit fixture 100. The conduit fixture can have a connection segment 102 with a first planar portion 202 and a second planar portion 204 angled relative to one another. In some embodiments, the second planar portion 204 can extend at 90 degrees from an edge of the first planar portion 202, such that the connection segment 102 is substantially L-shaped as shown in FIGS. 2A-2C. In other embodiments, the second planar portion 204 can extend from the second planar portion 202 at any other desired angle, such that the first planar portion 202 and second planar portion 204 are at an acute or obtuse angle relative to one another.

In some embodiments, the first planar portion 202 can define one or more connection apertures 206. The connection apertures 206 can be holes, slots, indentations, or cut-outs extending through the first planar portion 202, such that connectors 112 can be at least partially inserted through the connection apertures 206 to secure the first planar portion 202 against a building component 106. Connectors 112 can be screws, rivets, bolts, nails, staples, or any other type of connector that can hold the first planar portion 202 on or against a building component 106. In other embodiments, the connection apertures 206 can be absent, and the first planar portion 202 can be held against a building component 106 using brackets or straps, or be coupled with the building component using adhesives or any other desired method.

The conduit fixture's conduit holder 104 can be a segment that extends from the second planar portion 204 of the connection segment 102. In some embodiments, the connection segment 102 and conduit holder 104 can be integral, such that the conduit fixture 100 is a single piece of material and the conduit holder 104 is an extension of the second planar portion 204. In alternate embodiments, the connection segment 102 can be coupled with the conduit holder 104 via welding, rivets, screws, adhesives, or any other permanent or temporary connection method.

As shown in the front view of FIG. 2A, in some embodiments the conduit holder 104 can have a loop portion 208 that extends from an edge of the connection segment's second planar portion 204, extends around in a center point in a substantially circular shape, and terminates with an end portion 210 that proximate to the edge of the connection segment's second planar portion 204 where the loop portion 208 began. In alternate embodiments, the loop portion 208 can have an oval shape, triangular shape, square shape, rectangular shape, irregular shape, or have any other desired shape. As shown in FIGS. 2B and 2C, the conduit holder 104 can have a width that is substantially similar to the width of the second planar portion 204, and can be substantially straight along its width.

In some embodiments, the conduit holder's end portion 210 can be bent away from the curvature of the conduit holder's loop portion 208, such that the end portion 210 is substantially parallel to the connection segment's second planar portion 204. In these embodiments, the end portion 210 and second planar portion 204 can have connection apertures 206 that are substantially aligned, such that a connector 116 can selectively extend through the connection apertures 206 in the end portion 210 and second planar portion 204.

In use, the first planar portion 202 of the conduit fixture's connection segment 102 can be coupled to a building component 106 by extending connectors 116 through the connection apertures 206 in the first planar portion 202 and into the building component 106, as shown in FIG. 1, or using any other desired connection mechanism. Conduit 108 can be passed through the conduit fixture's conduit holder 104. The loop portion 208 can be oriented such that the conduit 108 extends through the conduit holder 104 orthogonally to the first planar portion 202 and the building component 106. In some embodiments the conduit 108 can pass around a side of the building component 106. In other embodiments the conduit 108 can pass through a hole or cut-out in the building component 106.

The conduit holder 104 can be tightened around the conduit 108 by tightening connectors 116 to bring the conduit holder's end portion 210 and the connection segment's second planar portion 204 closer together. By way of a non-limiting example, a bolt can pass through the connection apertures 206 in the conduit holder's end portion 210 and second planar portion 204, and a nut can be screwed onto the bolt to tighten the conduit holder's end portion 210 relative to the second planar portion 204, and thereby tighten the loop portion 208 around the conduit 108, as shown in FIG. 1. In some embodiments, the loop portion 208 can comprise at least partially flexible material, such that it can be tightened around inserted conduit 108.

Figures 3A, 3B:
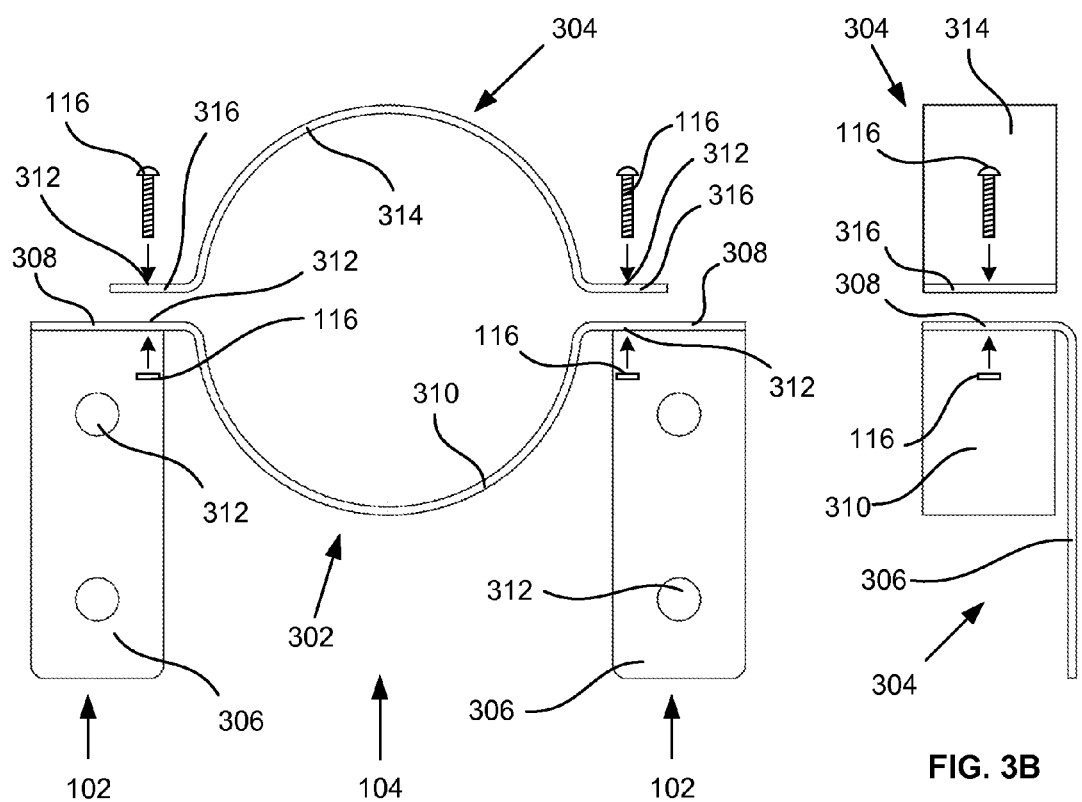
FIG. 3A depicts a front view of a second embodiment of a conduit fixture.
FIG. 3B depicts a side view of a second embodiment of a conduit fixture.
Figure 3C:
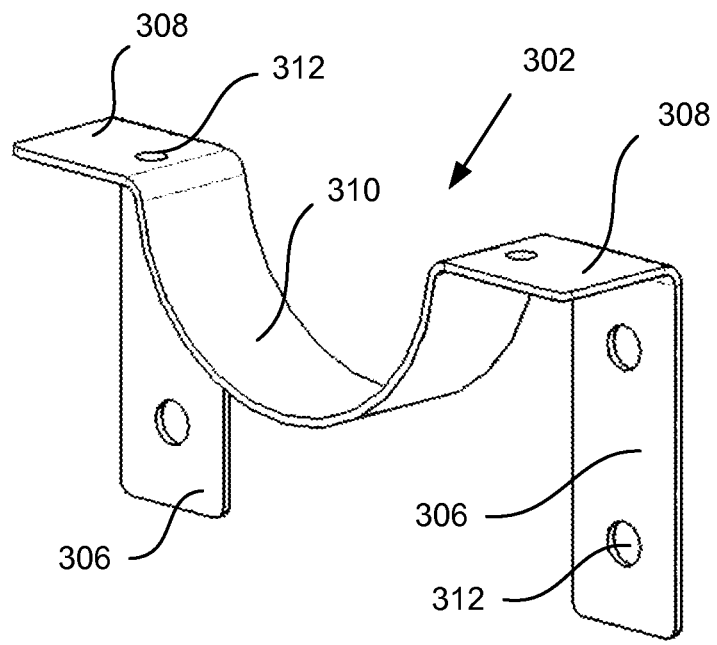
FIG. 3C depicts an angled view of a connection bracket for a second embodiment of a conduit fixture.
Figure 3D:
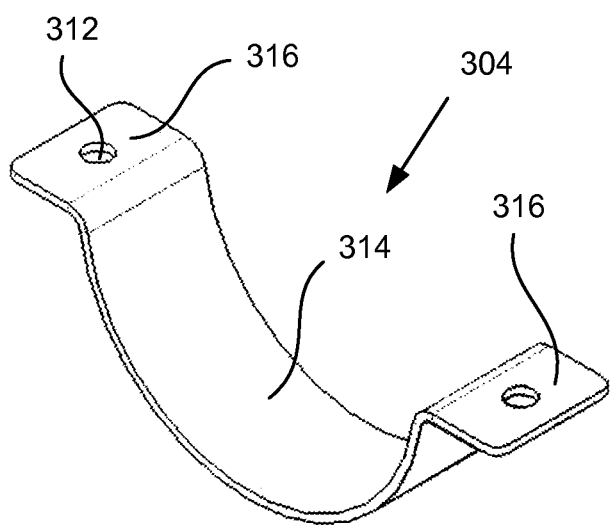
FIG. 3D depicts an angled view of a U-bracket for a second embodiment of a conduit fixture.

FIGS. 3A and 3B respectively depict a front view and side view of a second embodiment of a conduit fixture 100 comprising a connection bracket 302 and a U-bracket 304. FIG. 3C depicts an angled view of an embodiment of the connection bracket 302, and FIG. 3D depicts an angled view of an embodiment of the U-bracket 304. When the connection bracket 302 and U-bracket 304 are coupled with one another using connectors 116, this embodiment of the conduit fixture 100 can have two connection segments 102 and a two-piece conduit holder 104.

The connection bracket 302 can comprise two connection segments 102 that are connected by a U-shaped segment 310. Each of the two connection segments 102 can have a first planar portion 306 and a second planar portion 308 that are angled relative to one another. In some embodiments, the second planar portion 308 can extend at 90 degrees from an edge of the first planar portion 306, such that each connection segment 102 is substantially L-shaped as shown in FIGS. 3A-3C. In other embodiments, the second planar portion 308 can extend from the first planar portion 306 at any other desired angle, such that the first planar portions 306 and second planar portions 308 are at acute or obtuse angles relative to each other, or are on the same plane.

In some embodiments, the first planar portion 306 of each of the two connection segments 102 can define one or more connection apertures 312. The connection apertures 312 can be holes, slots, indentations, or cut-outs extending through the first planar portions 306, such that connectors 112 can be at least partially inserted through the connection apertures 312 to secure the first planar portions 306 against building components 106. In other embodiments, the connection apertures 312 can be absent, and the first planar portions 306 can be held against building components 106 using brackets or straps, or be coupled with building components using adhesives or any other desired method.

The connection bracket's U-shaped segment 310 can extend between edges of the two connection segments 102. In some embodiments, the U-shaped segment 310 can be a curved section that is formed substantially as a semicircle that extends away from an edge of each second planar portion 308. In alternate embodiments the U-shaped segment 310 can be formed as a portion of an oval shape, triangular shape, square shape, rectangular shape, irregular shape, or any other desired shape. As shown in FIGS. 3B and 3C, the connection bracket's U-shaped segment 310 can have a width that is substantially similar to the width of the second planar portions 308, and can be substantially straight along its width.

The conduit fixture's U-bracket 304 can be a separate component that substantially mirrors the connection bracket's U-shaped segment 310. In some embodiments the U-bracket 304 can have a U-shaped portion 314 that is formed substantially as a semicircle. In alternate embodiments the U-shaped portion 314 that is formed as a portion of an oval shape, triangular shape, square shape, rectangular shape, irregular shape, or any other desired shape. The U-shaped portion 314 can terminate at opposing ends with end portions 316. The end portions 316 can be bent away from the curvature of the U-shaped portion 314, such that the end portions 316 are substantially on the same plane as one another.

In some embodiments, the U-bracket's U-shaped portion 314 and the connection bracket's U-shaped segment 310 can substantially form two halves of a circle within the conduit holder 104 when the U-bracket 304 is placed against the connection bracket 302 as shown in FIG. 3A. However, in alternate embodiments the U-bracket's U-shaped portion 314 and the connection bracket's U-shaped segment 310 can substantially form two halves of an oval shape, triangular shape, square shape, rectangular shape, irregular shape, or any other desired shape.

In this embodiments, the end portions 316 of the U-bracket 304 and the second planar portions 308 of the connection bracket 302 can each define connection apertures 312. The connection aperture 312 on each end portion 316 of the U-bracket 304 can be substantially aligned with a corresponding connection aperture 312 in a second planar portion 308 of the connection bracket 302, such that connectors 116 can selectively extend through the connection apertures 312 between the connection bracket 302 and U-bracket 304.

In use, the first planar portions 306 of the connection bracket 302 can be coupled to one or more building components 106 by extending connectors 116 through the connection apertures 312 in the first planar portions 306 and into the building component 106, or using any other desired connection mechanism. Conduit 108 can be fit into the connection bracket's U-shaped segment 310, and the U-bracket 304 can be fit over the conduit 108 and be coupled with the connection bracket 302 with connectors 116 extending between aligned connection apertures 312 in the connection bracket 302 and U-bracket 304.

In this embodiment, the conduit fixture's two-part conduit holder 104 can be tightened around the conduit 108 to bring the connection bracket 302 and U-bracket 304 closer together. By way of a non-limiting example, bolts can pass through the connection apertures 312 in the U-bracket's end portions 316 and corresponding connection apertures 312 in the connection bracket's second planar portions 308, and a nut can be screwed onto the bolt to bring the connection bracket 302 and U-bracket 304 closer together around the conduit 108. The two-part conduit holder 104 can be oriented such that the conduit 108 extends through the conduit holder 104 orthogonally to the first planar portions 306 and the building components 106. In some embodiments the conduit 108 can pass around a side of the building component 106. In other embodiments the conduit 108 can pass through a hole or cut-out in the building component 106, or extend between building components 106 when the two connection segments 102 are coupled with different building components 106.

Although the invention has been described in conjunction with specific embodiments thereof, it is evident that many alternatives, modifications and variations will be apparent to those skilled in the art. Accordingly, the invention as described and hereinafter claimed is intended to embrace all such alternatives, modifications and variations that fall within the spirit and broad scope of the appended claims.

What is claimed is:

1. A conduit fixture, comprising:
   a first connection segment and a second connection segment, each of said first connection segment and said second connection segment being an L-shaped member comprising a first planar portion and a second planar portion, wherein in each of said first connection segment and said second connection segment said first planar portion extends directly from a first edge of said second planar portion substantially orthogonally from said second planar portion;
   a U-shaped segment extending between second edges of said first connection segment and said second connection segment, said second edges of said second planar portions being adjacent to said first edges of said second planar portions; and
   a U-bracket having a U-shaped portion and end portions extending from opposing ends of said U-shaped portion, said end portions being bent to be substantially parallel to the second planar portion of said first connection segment and said second connection segment,
   wherein said U-shaped portion and said U-shaped segment together form a circular shape configured to hold a portion of wiring conduit that extends through said conduit holder orthogonally to the plane of said first planar portions, and
   wherein said first planar portions define one or more connection apertures.

2. The conduit fixture of claim 1, wherein said end portions and the second planar portions of said first connection segment and said second connection segment each define connection apertures, such that a first connector can extend through one end portion and one second planar portion, and a second connector can extend through the other end portion and the other second planar portion.

3. The conduit fixture of claim 2, wherein said first connector holds said one end portion and said one second planar portion together, and said second connector holds said other end portion and said other second planar portion together.

4. A conduit fixture, comprising:
   a connection bracket having a first connection segment, a second connection segment, and a U-shaped segment extending between said first connection segment and said second connection segment, said first connection segment and said second connection segment each being an L-shaped member comprising a first planar portion and a second planar portion, said first planar portion extending directly from a first edge of said second planar portion substantially orthogonally from said second planar portion, and said U-shaped segment extending between a second edge of the second planar portion of said first connection segment and a second edge of the second planar portion of said second connection segment, said second edges being adjacent to the first edges of said second planar portion of said first connection segment and said second connection segment; and
   a U-bracket comprising a U-shaped portion and two end portions extending from opposing ends of said U-shaped portion, said end portions being bent such that they can be oriented to each be parallel to the second planar portions of said first connection segment and said second connection segment,
   wherein said U-shaped portion and said U-shaped segment together form a circular shape when said connection bracket and said U-bracket are placed together,
   wherein said U-shaped portion and said U-shaped segment are configured to together hold a portion of wiring conduit that extends through said circular shape orthogonally to the plane of the first planar portions of said first connection segment and said second connection segment, and
   wherein the first planar portions of said first connection segment and said second connection segment define one or more connection apertures.

5. The conduit fixture of claim 4, wherein said end portions and said second planar portions of said first connection segment and said second connection segment each define connection apertures, such that a first connector can extend through one end portion and one second planar portion, and a second connector can extend through the other end portion and the other second planar portion.

6. The conduit fixture of claim 5, wherein said first connector holds said one end portion and said one second planar portion together, and said second connector holds said other end portion and said other second planar portion together.

* * * * *